United States Patent [19]

Peter

[11] 4,322,970
[45] * Apr. 6, 1982

[54] METHOD AND APPARATUS FOR CONTROLLING START-UP OF AIRFLOW MEASURING SYSTEMS IN AUTOMOTIVE VEHICLES

[75] Inventor: Cornelius Peter, Stuttgart, Fed. Rep. of Germany

[73] Assignee: Robert Bosch GmbH, Stuttgart, Fed. Rep. of Germany

[*] Notice: The portion of the term of this patent subsequent to Apr. 8, 1997, has been disclaimed.

[21] Appl. No.: 100,050

[22] Filed: Dec. 4, 1979

Related U.S. Application Data

[62] Division of Ser. No. 944,587, Sep. 21, 1978, Pat. No. 4,196,622.

[30] Foreign Application Priority Data

Nov. 9, 1977 [DE] Fed. Rep. of Germany ....... 2750050

[51] Int. Cl.³ .......................................... G01M 15/00
[52] U.S. Cl. ......................................... 73/118; 73/204
[58] Field of Search ......................... 73/118, 116, 204; 123/472, 478, 494

[56] References Cited

U.S. PATENT DOCUMENTS 3,645,133  2/1972  Simeth et al. ..................... 73/204
3,903,875  9/1975  Hughes ........................... 73/204 X
3,988,928  11/1976  Edstrom et al. ................. 73/204

*Primary Examiner*—Jerry W. Myracle
*Attorney, Agent, or Firm*—Frishauf, Holtz, Goodman & Woodward

[57] ABSTRACT

To effect reliable start-up of electronic systems in which a comparator compares a measured value with a reference, particularly in which a comparator senses current flow through a temperature sensitive resistor exposed to airflow to maintain the resistance value of the resistor at a predetermined level, with respect to the reference, a start-up signal circuit is provided to supply a minimum signal to the comparator before the system is operative so that the comparator will initially provide an output to control the current source for the sensing resistor to heat the sensing resistor to its desired level. The minimum signal is derived, for example, from a voltage divider and connected over a diode to the comparator which, typically, is an operational amplifier, the diode being so poled that, when the signal from the sensing resistor exceeds the minimum signal, it will block, thus cutting off application of the minimum start-up signal from affecting further operation of the circuit.

11 Claims, 3 Drawing Figures

METHOD AND APPARATUS FOR CONTROLLING START-UP OF AIRFLOW MEASURING SYSTEMS IN AUTOMOTIVE VEHICLES

The present application is a divisional of my application Ser. No. 944,587, filed Sept. 21, 1978, now U.S. Pat. No. 4,916,622.

The present invention relates to apparatus to control the start-up of electronic systems, and more particularly of measuring systems measuring the quantity of airflow through a particular part of an internal combustion engine system, especially to control the start-up of an airflow measuring system which measures the air flowing through the air intake of an internal combustion engine.

BACKGROUND AND PRIOR ART

Apparatus has been proposed to measure the quantity of air flowing through the air intake of an internal combustion engine by means of a sensing element, whose resistance varies as a function of temperature. The sensing element is positioned in the airflow and its change in resistance corresponds to the quantity of air flowing thereby. The sensing element forms part of a bridge circuit. A regulating circuit increases the current through the sensing element until the bridge is rebalanced, that is, the sensing element is kept at a substantially constant operating temperature. The change in current constitutes a measure of the quantity of the air flowing past the sensing element. Systems of this type are known, see, for example, U.S. Pat. No. 3,747,577. This system has the disadvantage that deposits will accumulate on the sensing element during its operating life, thereby greatly decreasing the accuracy of the measurements. Further, under certain operating conditions of an internal combustion engine, it is possible that reversal in the direction of airflow occurs, causing errors.

Special conditions pertain during start-up of the system, that is, before steady-state conditions have established themselves.

THE INVENTION

It is an object of the present invention to eliminate difficulties occurring during start-up of an electronic measuring system, and before steady-state conditions have established themselves, and more particularly to provide a system for combination with an airflow measuring system, as described and claimed in the parent application U.S. Ser. No. 944,587, filed Sept. 21, 1978, now U.S. Pat. No. 4,196,622, which enables effective start-up of the measuring system, without introducing measuring errors.

Briefly, a regulator, for example an airflow measuring apparatus, is connected to a sensing element, for example and preferably an airflow sensor, the regulator furnishing a regulator signal to the sensing element to maintain the sensing element at a selected temperature. The regulator includes a controlled current source which is connected to the sensing element to supply current thereto; a comparator and control amplifier, for example an operational amplifier, compares the output signal representative of current flow through the temperature varying resistor with a reference. To start up the system, a separate start-up signal generating circuit is provided which supplies an initial or start-up signal to the comparator and control amplifier—typically the operational amplifier—by connecting a minimum signal thereto for comparison of the minimum signal with the reference so that an output can be obtained from the comparator and control amplifier to initially control the controlled current source to supply the temperature varying resistor with current upon start-up of the system.

In accordance with a feature of the invention, the method of method of starting up includes providing an initial signal of a certain minimum level to a comparator element sufficient to cause the comparator element to furnish an output signal which, then, can control the start-up of the system by regulating a further current supply element to operative conditions.

The system is particularly important in connection with the feature described and claimed in the parent application, now U.S. Pat. No. 4,196,622, in which additional heating means is provided to the temperature sensing resistor which operates when the engine is OFF and at selected time instants throughout the operating life of the sensing element to increase the temperature of the sensing element above the operating temperature sufficiently to cause the burning-off of deposits which may accumulate thereon.

DRAWINGS, ILLUSTRATING A PREFERRED EMBODIMENT

Figure 1:
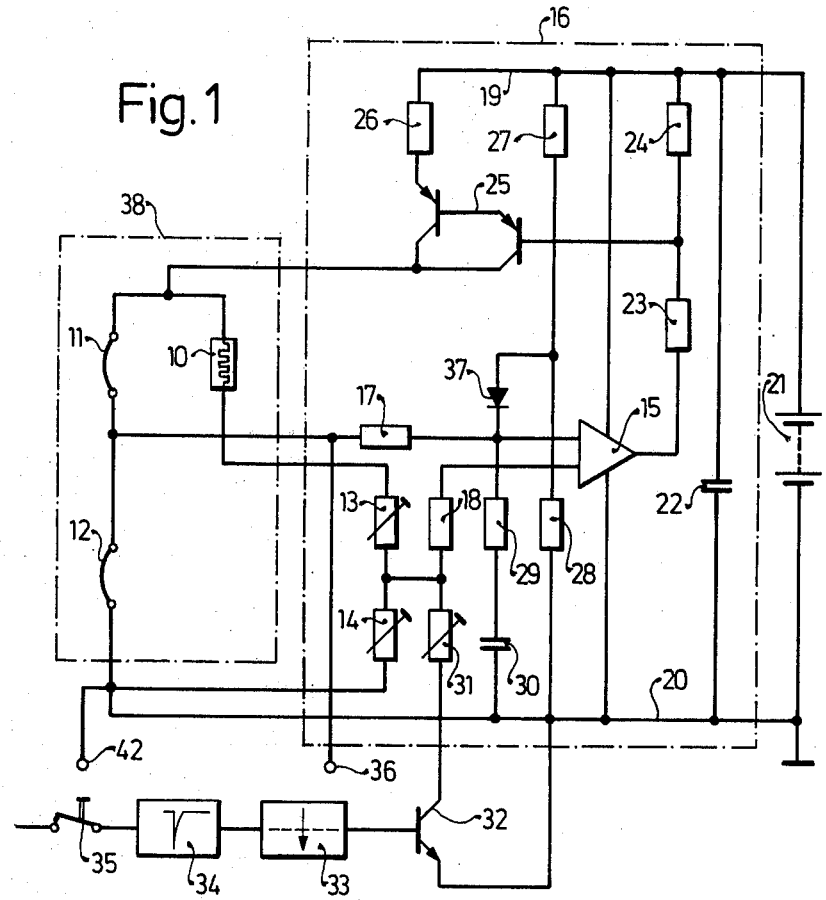
FIG. 1 is a circuit diagram of the system of the present invention, incorporated in an airflow sensing system.

The bridge circuit shown in FIG. 1 includes a temperature varying resistor 10 which is provided to compensate for ambient temperature variations; a temperature varying resistor 11, included in the induction pipe of an internal combustion engine system E, for example of the automotive type; a second resistor 12, which may be of the temperature varying type, and voltage divider resistors 13, 14 which, preferably, are adjustable. Bridge output terminals are connected to an operational amplifier 15 which forms part of a regulator circuit 16. Specifically, the inverting input of amplifier 15 is connected through a resistor 17 to the common point of resistors 11 and 12, while the direct input of amplifier 15 is connected through a resistor 18 to the common point of resistors 13 and 14. A first and second supply line, 19, 20, connect operational amplifier 15 to a DC voltage source 21. A filter capacitor 22 is connected in parallel with DC voltage source 21. The output of operational amplifier 15 is connected through a series circuit including resistors 23 and 24 to line 19. Resistances 23 and 24 form a voltage divider for a Darlington circuit 25 which together with a resistor 26 forms a voltage-controlled current source for the bridge circuit. A voltage divider including resistors 27 and 28 is connected between lines 19 and 20. The common point of resistors 27 and 28 is connected to the anode of a diode 37 whose cathode is connected to the inverting input of amplifier 15. A series circuit including a resistor 29 and a capacitor 30 is connected between the inverting input of amplifier 15 and line 20. This resistor-capacitor circuit tunes the regulating circuit to the response time of the hot wire.

In a preferred embodiment utilizing a platinum wire with 70 μm diameter as temperature varying resistor, the values of resistance and capacitance of resistor 29 and capacitor 30 were 680kΩ and 33 nF, when utilizing a value of 4.7kΩ for resistor 17.

The common point of resistors 13 and 14 is also connected to a variable resistor 31 whose other terminal is connected to the emitter-collector circuit of a transistor 32. The base of the transistor 32 is connected to the output of a monostable multivibrator 33 whose input is connected to the output of a differentiating circuit 34. The input of differentiating circuit 34 is connected to a switch 35 which, preferably, is the ignition switch of the internal combustion engine.

OPERATION

A predetermined current flows through temperature varying resistor 11 of the bridge circuit and heats resistor 11 to its normal operating temperature. Temperature varying resistor 10 is connected in another branch of the bridge circuit and is physically located in the air intake away from the airflow so that it is responsive to the temperature in the air intake but not responsive to the quantity of air flowing therethrough. The temperature of air in the air intake thus serves as a reference signal for the bridge circuit, that is the effect of changes of temperature in the air intake on resistor 11 is substantially eliminated. Resistor 11 is cooled to greater or lesser extent depending upon the quantity of air flowing thereby. This causes the bridge circuit to be unbalanced. The balance of the bridge circuit is restored by an increase in current through resistor 11 as furnished by constant current source 23, 24, 25 and 26 in response to an increase of voltage applied to the constant current source by amplifier 15. The current flowing through the bridge circuit is a measure of the quantity of air flowing past resistor 11. A corresponding electrical signal can be derived between terminal 36 and 42.

Figure 3:
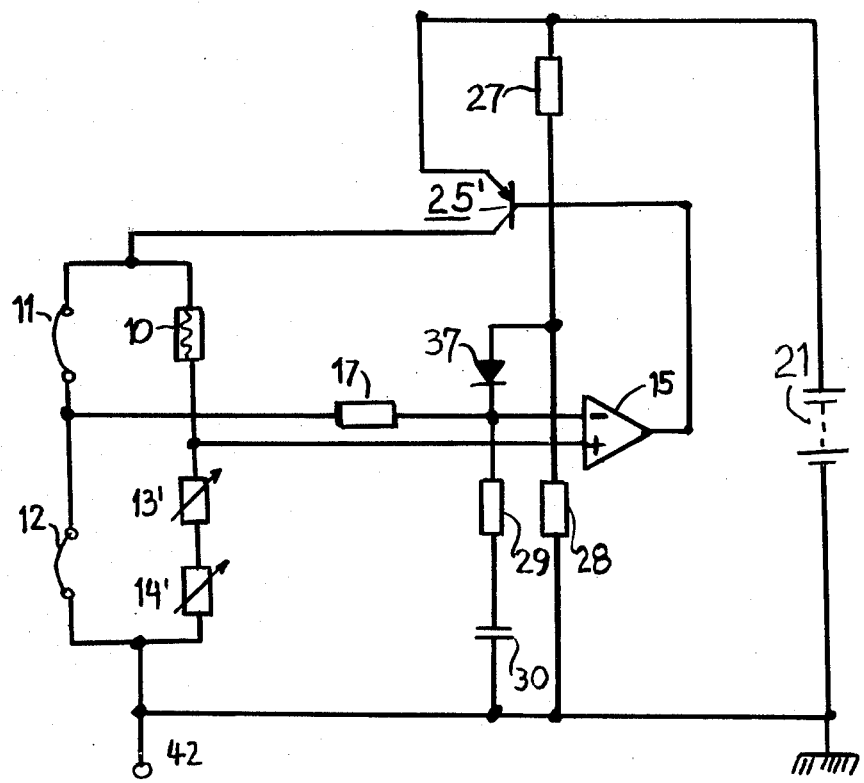
FIG. 3 is a fragmentary abbreviated circuit similar to the circuit of FIG. 1 in which the elements forming the start-up circuit are taken out of the overall system, to facilitate understanding of the method in accordance with the present invention.

Referring now also to FIG. 3: The start-up of the regulating circuit, in accordance with a feature of the invention, is facilitated by voltage divider 27, 28 and diode 37. When the equipment is first energized, the voltage at the inverting input of amplifier 15 is constrained to have a value of approximately 0.5 volts. This ensures that the circuit will start functioning and provide a minimum signal. During normal operation of the system, the voltage at the inverting input of amplifier 15 will be substantially higher than this start-up voltage, so that diode 37 will be blocked, thereby eliminating any influence of voltage divider 27, 28 on the circuit. The R/C circuit 29, 30 functions essentially as a timing circuit. It matches the frequency response of the regulating circuit to the time constant of the hot wire to optimize transients.

Referring again to FIGS. 1 and 2: During its operating life, resistor 11 will accumulate deposits on its surface. To burn off these deposits, it is desired that the current through resistor 11 will be increased at the predetermined time instants so that the temperature increases sufficiently to burn off the deposits. The selected time interval at which the burn-off is to occur may, for example, be each time that the ignition switch is turned off. Thus, burn-off will occur when the engine is stopped or OFF. The signal resulting from the turn-off of ignition switch 35 is differentiated in differentiator stage 34. The output signal from differentiator circuit 34 switches monostable multivibrator 33 to the unstable state. During this unstable state, transistor 32 becomes conductive causing resistor 31 to be connected in parallel with resistor 14 of the bridge circuit. This causes the bridge circuit including resistors 11, 12, 10, 13 and 14 to be sharply unbalanced in the sense in which amplifier 15 causes the constant current source to furnish a greatly increased current to the bridge circuit. This increased current heats temperature-dependent resistor 11 during the time that monostable multivibrator 33 is in the unstable state. The resistor is heated to a temperature sufficiently above the normal operating temperature so that deposits at its surface are burned off. In a preferred embodiment of the invention, the time that monostable multivibrator 33 is in the unstable state is 3 seconds and the temperature reached by resistor 11 is 800° C. to 900° C.

Use of a structure-stabilized platinum wire as resistor 11 has been found to be particularly advantageous because this material is particularly suitable for heating to high temperatures. This of course is very important for the burn-off process.

Broken line 38 in FIG. 1 indicates the physical location within the air intake. It should be noted that it is preferred that resistor 12 is also positioned in the air intake so that its heating losses can be carried away in the airflow. Resistors 13 and 14 are, preferably, adjustable resistors so that the temperature characteristic of the regulating circuit can be adjusted.

Figure 2:
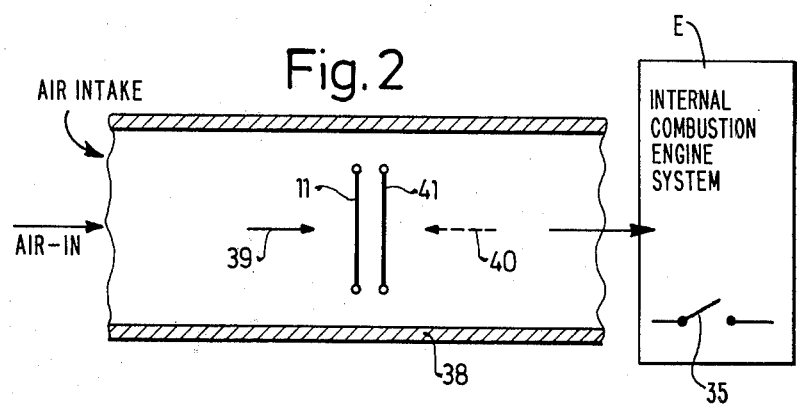
FIG. 2 shows two resistance elements positioned in the air intake of an internal combustion engine.

FIG. 2 is a diagram showing the intake pipe 38 of the internal combustion engine E. Temperature-dependent sensing element 11 is located in the pipe 38. Under predetermined operating conditions of the internal combustion engine, for example at a low engine speed and full load, strong pulsations can occur in the intake pipe of the internal combustion engine. This can cause short time changes in the direction of airflow as indicated by broken arrow 40. An additional cooling of resistor 11 by the returning air takes place, causing incorrect measurement results. To eliminate or at least minimize this measurement error, a temperature independent resistor 41, electrically connected in series with resistor 11 is positioned downstream of resistor 11 in the normal direction of airflow. The two resistance values are at first equal, causing the two resistors to be at substantially the same temperature. Under normal conditions, that is with airflow in the direction indicated by arrow 39, resistor 41 has no effect. However, when the direction of airflow reverses for a short time, the returning air is preheated by resistor 41 before passing by resistor 11. In the ideal case the air prewarmed by resistor 41 has the same temperature as resistor 11 so that its influence on the temperature of resistor 11 is completely eliminated. In order to achieve this effect, resistor 41 must be connected into the bridge circuit. For example, resistor 41 could take the place of resistor 12.

Preferably, regulator circuit 16 is constructed as a hybrid circuit. Further, it is particularly advantageous to enclose the hybrid circuit with the elements which are arranged in the air intake, that is with the temperature dependent resistor 10, temperature dependent resistor 14 and, possibly, temperature independent resistor 12 in a single housing. This greatly improves the reliability of the apparatus. Loose contacts, for example at plug connections, can no longer destroy sensor 11. Resistances in connecting lines between the bridge circuit and the operational amplifier are eliminated as is interference from, for example, the ignition circuit. The single housing also eliminates line reactances.

In a further preferred embodiment of the invention, Darlington stage 25 as well as resistor 26 are also arranged in the airflow so that the airflow also dissipates the heat generated in this stage.

FIG. 3 illustrates, in fragmentary form, that portion of the circuit which is particularly involved in the start-up operation, in which the Darlington transistor 25 has been shown, schematically, merely as a single resistor 25', and the bridge circuit to the direct input of the operational amplifier is shown in abbreviated form by resistors 13', 14'. All other elements are identical to those previously described, and function similarly. The operation of the start-up circuit is independent of the system which removes undesired deposits by periodic heating of the sensing element, but particularly suitable in connection therewith.

Various changes and modifications may be made within the scope of the inventive concept.

I claim:

1. Measuring system having
   a sensing resistor (11) forming a sensing element and changing resistance in accordance with change of an external parameter to be sensed;
   a controlled current source (25) connected to and supplying said sensing resistor with current;
   a comparator (15) comparing an output signal representative of current flow through said sensing resistor with a reference (13, 14);
   and start-up signal generating means (27, 28) connected to said comparator (15) and applying a minimum signal thereto for comparison with the reference to permit output to be obtained by said comparator and initially control said controlled current source (25) to supply the sensing resistor with current upon start-up of the system.

2. Measuring system according to claim 1, wherein the start-up signal generating means comprises a voltage divider.

3. Measuring system according to claim 2, further including a diode (37) coupled to the tap point of the voltage divider (27, 28) and further connected to said comparator (15) to couple the minimum signal to the comparator.

4. Measuring system according to claim 3, wherein the diode is poled to cut off said minimum signal when exceeded by the output signal representative of current flow through the sensing resistor.

5. Measuring system according to claim 1, including a diode (37) coupling the minimum signal from the start-up signal generating means to the comparator (15).

6. Measuring system according to claim 1, wherein the sensing resistor comprises a temperature varying resistor.

7. Measuring system according to claim 6, wherein said measuring system includes a bridge circuit;
   said temperature varying resistor (11) being connected in said bridge circuit and having a resistance changing as a function of said external parameter which, upon change, unbalances the bridge circuit; and
   said comparator furnishing a regulator signal to the controlled current source (25) to supply current to reheat the temperature varying resistor to a predetermined selected temperature independent of change of said parameter, whereby the amplitude of the regulator current constitutes a measure of said parameter.

8. Measuring system according to claim 7, wherein said measuring system comprises an airflow measuring system, said temperature varying resistor being positioned in a duct guiding said airflow.

9. In an internal combustion engine system having an air intake pipe (38) to induct air thereto,
   the system of claim 7, wherein the temperature varying resistor (11) is positioned in the intake pipe of the engine, and said parameter is the airflow to the engine.

10. In a method to sense a changing parameter in which
    a sensing resistor (11) forms a sensing element and changes its resistance in accordance with change of the external parameter to be sensed;
    a controlled current source (25) is connected to and supplies said sensing resistor with electrical current;
    and a comparator (15) compares an output signal representative of current flow through said sensing resistor with a reference (13, 14),
    a method to control reliable start-up of the comparator-controlled current source network comprising generating a start-up signal of a minimum level and applying said start-up signal of minimum level to the comparator to provide an initial minimum comparison input to the comparator to compare said comparison input with the reference and thus provide output from the comparator to the controlled current source to cause the controlled current source to supply the resistor with an initial current upon start-up of the system.

11. Method according to claim 10, including the further step of blocking application of said start-up signal of minimum level after start-up of the system and when the minimum level of the start-up signal is exceeded by the output signal representative of current flow through the sensing resistor being applied to the comparator.

* * * * *